United States Patent
Esser et al.

(10) Patent No.: US 8,118,425 B2
(45) Date of Patent: Feb. 21, 2012

(54) GLASSES LENS COMPRISING A CARRYING EDGE

(75) Inventors: Gregor Esser, Munich (DE); Helmut Altheimer, Baisweil-Lauchdorf (DE); Andrea Welk, Munich (DE); Martin Zimmermann, Erdweg-Kleinberghofen (DE); Wolfgang Becken, Munich (DE); Edda Wehner, Emmering (DE)

(73) Assignee: Rodenstock GmbH, Munich (DE)

( * ) Notice: Subject to any disclaimer, the term of this patent is extended or adjusted under 35 U.S.C. 154(b) by 178 days.

(21) Appl. No.: 10/591,640

(22) PCT Filed: Feb. 21, 2005

(86) PCT No.: PCT/EP2005/001784
§ 371 (c)(1),
(2), (4) Date: May 13, 2008

(87) PCT Pub. No.: WO2005/085937
PCT Pub. Date: Sep. 15, 2005

(65) Prior Publication Data
US 2008/0231800 A1  Sep. 25, 2008

(30) Foreign Application Priority Data
Mar. 3, 2004 (DE) .......................... 10 2004 010 338

(51) Int. Cl.
G02C 7/02 (2006.01)
G02C 7/06 (2006.01)
(52) U.S. Cl. ......... 351/159; 351/154; 351/168; 351/177
(58) Field of Classification Search .................. 351/177, 351/178, 154, 159, 164, 168–172, 174
See application file for complete search history.

(56) References Cited

U.S. PATENT DOCUMENTS

| | | | | |
|---|---|---|---|---|
| 3,063,340 | A * | 11/1962 | Dillon | 351/174 |
| 4,279,480 | A * | 7/1981 | Bettiol et al. | 351/159 |
| 4,784,482 | A * | 11/1988 | Guilino | 351/169 |
| 5,608,471 | A * | 3/1997 | Miller | 351/161 |
| 6,199,983 | B1 * | 3/2001 | Kato et al. | 351/169 |
| 7,147,325 | B2 * | 12/2006 | Gotou et al. | 351/160 R |
| 7,338,340 | B2 * | 3/2008 | Poesch | 446/297 |
| 7,413,502 | B2 * | 8/2008 | Mandler et al. | 451/42 |
| 2010/0039620 | A1 * | 2/2010 | Legerton et al. | 351/247 |

FOREIGN PATENT DOCUMENTS

| | | |
|---|---|---|
| DE | 30 16 936 A1 | 11/1981 |
| DE | 82 22 426 U1 | 3/1983 |
| DE | 33 43 891 A1 | 6/1985 |
| JP | 61023106 A | 1/1986 |
| WO | WO 97/15857 A2 | 5/1997 |

OTHER PUBLICATIONS

International Search Report dated Jun. 17, 2005 including English Translation of relevant portion and PCT/ISA/237 with English Translation of relevant portion (Eleven (11) pages).
Japanese Office Action dated Aug. 3, 2010 including English translation of relevant portion (Seven (7) pages).

* cited by examiner

Primary Examiner — Darryl J Collins
(74) Attorney, Agent, or Firm — Crowell & Moring LLP

(57) ABSTRACT

A spectacle lens with an object-sided front face and an eye-sided rear face, wherein at last the rear face comprises a viewing region that contributes to the optical effect of the spectacle lens and a carrier rim region that at least partially surrounds the viewing region and that does not significantly contribute to the optical effect of the spectacle lens. The rear face of the spectacle lens in the carrier rim zone is constructed substantially from a cosmetic viewpoint without consideration of the optical image-forming properties. A method for producing this spectacle lens is also provided.

9 Claims, 4 Drawing Sheets

GLASSES LENS COMPRISING A CARRYING EDGE

CROSS REFERENCE TO RELATED APPLICATIONS

This application is a National Phase of PCT/EP2005/001784, filed Feb. 21, 2005, and claims the priority of DE 10 2004 010 338.0, filed Mar. 3, 2004, the disclosures of which are expressly incorporated by reference herein.

BACKGROUND AND SUMMARY OF THE INVENTION

The present invention relates to a spectacle lens with a carrier rim region as well as a method for producing a spectacle lens with a carrier rim region.

The use of spectacle lenses with a carrier rim, to reduce the weight, especially of spectacle lenses for correcting extremely defective vision, like extreme myopia, or for patients having undergone gray cataract surgery without an implanted lens, has been proposed in the past.

DE 30 16 936 A1 describes spectacle lenses with atoric surfaces that are characterized by very good image-forming properties for a specific (central) area. WO 97/15857 describes double aspheric spectacle lenses. They are characterized in that the image-forming properties are very good in the central area, that at least indirect, orienting vision is just barely possible in the peripheral area, and the critical thickness is, nevertheless, reduced. DE 33 43 891 A describes a spectacle lens with a carrier rim. Carrier rim lenses (also called lenticular lenses) are spectacle lenses, in which only the central portion of the spectacle lens delivers the corresponding optical effect, whereby the outer area surrounding the central portion is used merely for fastening in the spectacle frame. Owing to the carrier rim, the center thickness is reduced in the spectacle lens, according to DE 33 43 891 A1, at the expense of the image-forming quality.

An object of the present invention is to provide a spectacle lens as well as a method for calculating a spectacle lens in which, due to a carrier rim, the cosmetic properties, especially the edge thickness, its variation and/or the center thickness, are significantly improved without significantly influencing or having a negative impact on the image-forming properties.

This object has been achieved by way of a spectacle lens, and method for producing that lens having an object-sided front face and an eye-sided rear face, wherein at least the rear face has a viewing region that contributes to the optical effect of the spectacle lens, and a carrier rim region that at least partially surrounds the viewing region and which does not significantly contribute to the optical effect of the spectacle lens, and the rear face of the spectacle lens in the carrier rim region is designed substantially from a cosmetic viewpoint without consideration of the optical image-forming properties.

The present invention is based on the understanding that the peripheral area of the rear face (i.e., the eye-sided face of the spectacle lens), especially in spectacle lenses with negative effect, has an area that is not used significantly for seeing. Therefore, the rear face of the spectacle lens in this area may be especially designed so that the cosmetic properties of the spectacle lens are improved without significantly influencing its optical properties or rather its image-forming quality. This area constitutes the spectacle lens' carrier rim region that, together with the front face, forms a carrier rim. Cosmetic properties are defined in particular as the edge thickness, its variation, the center thickness, the weight and the volume of the spectacle lens.

The viewing region is preferably separated from the carrier rim region on the rear face of the spectacle lens by a dividing curve that connects the penetrating points of the main rays to the rear face. These main rays (hereinafter referred to as the outermost peripheral rays) just barely pass, under direct vision, through the point of rotation Z' of the eye when the spectacle lens is in use position in front of an eye of a spectacle wearer; or in an especially preferred case these outermost peripheral rays just barely pass, under indirect vision, through the center of the entrance pupil of the eye. Then the carrier rim region extends from the dividing curve radially to the outside as far as the rim of the spectacle lens or preferably as far as a curve (peripheral curve) that matches the rim of the spectacle lens in the encased state. The dividing curve is an imaginary curve on the rear face.

Under indirect vision and on viewing through the accommodating point, the entrance pupil of the eye constitutes the aperture stop of the system, comprising the spectacle lens and the eye, and, thus, defines the course of the main rays. Under indirect vision the filed of vision is defined by those main rays that just barely penetrate both the front and the rear face of the spectacle lens and pass through the center of the entrance pupil of an eye when the spectacle lens is in use position. These (critical) main rays are called the outermost peripheral rays within the meaning of this invention. Since in this case the object-sided, outer axial object points (also called field points) do not pass through the center of the entrance pupil, in particular, the design of the rear face does not have any significant influence on the optical properties of the spectacle lens in an area that extends from the penetrating points of the outermost peripheral ray through the rear face radially to the rim of the spectacle lens. Therefore, under indirect vision this area forms preferably the carrier rim region.

Because it is more likely that indirect vision will be necessary on the periphery, the outermost peripheral rays are applied, under indirect vision, as the outermost peripheral rays when the spectacle lens is in use position. The result is a relatively large area (i.e., a relatively large carrier rim region) that may be used for improving the cosmetic properties.

Under indirect vision (i.e., especially when the eye is looking in the zero viewing direction), the small field of the perceivable region of interest is controlled by the head movements. However, under direct vision with the spectacle lens in use position it is not the head, but rather the eye, that performs the viewing movements in order to image, if possible, the objects of interest on the central area of the fovea. Under direct vision the eye rotates approximately about the optical point of rotation Z' of the eye. As the apparent aperture stop, said point of rotation also brings about the position of the exit pupil of the system, comprising spectacle lens and eye, and in this way defines the course of the main rays and, therefore, also the course of the outermost peripheral rays. After the refraction through the spectacle lens, the outermost peripheral rays pass through the point of rotation Z' of the eye. The penetrating points of the outermost peripheral rays through the rear face are spaced somewhat apart from the rim of the spectacle lens, so that the rear face has an area that extends from the penetrating points of the outermost peripheral rays through the rear face as far as the rim of the spectacle lens and that does not add, under direct vision, to the optical effect. In the case of direct vision this area constitutes the carrier rim region.

The calculation of the position of the dividing curve may be carried out on the basis of an average or conventional eye or according to the individual parameters of the eye of the respective spectacle wearer. For example, the so-called Gullstrand model eye may be used. The distance between the spectacle vertex and the entrance pupil of the model eye is then approximately HSA+3.05 mm, where HSA stands for the cornea-vertex-distance. The point of rotation of this average eye is approximately 13.5 mm behind the cornea, or at a standard HSA of 15 mm it is spaced 28.5 mm apart from the spectacle vertex. Since the entrance pupil is closer to the eye than the point of rotation of the eye, the optically non-useable area that constitutes the carrier rim region will be somewhat larger under indirect vision than under direct vision. The fovea exhibits usually an angular recess of 5 degrees. The course and the calculation of the outermost peripheral rays upon direct and indirect vision as well as the resulting dividing curve shall be explained in detail below.

Reference is made to *Optik und Technik der Brille* [Optics and the Technology of Spectacles] by Heinz Diepes and Ralf Blendowske, Optische Fachveröffentlichung GmbH, Heidelberg, 2002, especially with respect to the technical terms that are used and the model eye. In this respect, moreover, the information in this book represents an integral part of the disclosure of the present application.

Moreover, the spectacle lens exhibits a positive, negative, progressive, astigmatic and/or prismatic optical power.

The carrier rim region is designed preferably such that the shape and/or the design of the frame is taken into consideration. The shape of the frame, which is often referred to as the so-called discoid shape, is defined as a mathematically clear parameterization of the shape of the rim of the spectacle lens. The shape of the frame indicates how the round-shaped lens has to be machined on the rim so that the lens will fit into the spectacle frame. There exist, for example, round, oval or tear-shaped frames. The description of the shape of the frame will indicate whether it is, for example, a rimless frame or a very thick plastic frame. The edge thickness of the spectacle lens may be chosen to match the frame.

Therefore, it is especially advantageous to know the shape of the frame. Then the rear face in the carrier rim region may be produced so that the edge thickness of the spectacle lens or rather its variation in the encased state or rather along a curve that matches the rim of the spectacle lens in the encased case (hereinafter also referred to as the peripheral curve) is optimally contoured. However, the rear face in the carrier rim region may also be designed such that the edge thickness, its variation, etc., exhibit the predetermined optimal values for round-shaped spectacle lenses.

Furthermore, the rear face in the carrier rim region is designed preferably so that the individual parameters of the spectacle wearer may be considered. Individual parameters of the spectacle wearer are, for example, the distance between the cornea and the vertex, front inclination, pupil distance, lateral inclination, angle of the frame disc, distance of the point of rotation of the eye, length of the eye construction, distance of the object, etc. With these parameters, the exact course of the outermost peripheral rays in use position can be calculated or rather their penetrating points through the rear face and also the area may be used for improving the cosmetic properties. This enables an optimal design of the rear face in the carrier rim region and thus improved cosmetic properties of the spectacle lens. The calculation may, however, also be made with the aid of the standard values.

According to another preferred embodiment, the rear face of the spectacle lens is designed so that the rear face in the carrier rim region is joined at in a least once, preferably in a twice continuously differentiable manner to the rear face in the viewing region.

The rear face is designed preferably in such a manner that an edge thickness, edge thickness variation and/or center thickness of the spectacle lens may be reduced. Furthermore, the rear face in the carrier rim region may be designed preferably such that the volume and the mass of the spectacle lens may be reduced.

High demands with respect to not only the optical properties but also the cosmetic properties and the weight are placed on modern spectacle lenses. For aesthetic and tolerability reasons, the spectacle lenses ought to be as thin and lightweight as possible, while at the same time in particular the edge thickness ought to be minimized. Furthermore, the edge thickness ought to be designed uniformly with minimal variations.

Excessive center thickness and, based on the shape of the frame, non-uniform edge thickness, especially in spectacle lenses for hyperopia (i.e., spectacle lenses with positive optical effect), however, make the spectacle lenses look unappealing from a cosmetic viewpoint. In spectacle lenses for myopia (i.e., spectacle lenses with negative effect) the edge thickness and the non-uniform variation in the edge thickness, based on the shape of the frame, are the critical parameters. In both cases, the volume and, thus, also the weight of the spectacle lens increases, especially as the optical effects increase, a feature that may result in intolerability and rejection of the spectacle lens.

In spectacle lenses for spectacle wearers with defective vision due to astigmatism, the non-uniform variation of the edge thickness is the critical parameter. In spectacle lenses for heterophoria (i.e., spectacle lenses with prismatic effect) predominantly the non-uniform edge thickness but also the center thickness are the critical parameters. In spectacle lenses for presbyopia (i.e., spectacle lenses with progressive effect) predominantly the non-uniform variation of the edge thickness is the critical variable. Of course, in spectacle lenses with combined effects combinations of the listed requirements may also occur.

The rear face in the carrier rim region is designed, according to the present invention, so that the critical parameters for the indicated types of spectacle lenses fall within the predetermined intervals and/or may be met as much as possible.

The rear face in the carrier rim region is designed preferably such that the maximum edge thickness of the spectacle lens may be reduced by preferably at least 5%, especially 10%; and/or the variation in the edge thickness of the spectacle lens may be reduced by preferably at least 10%, especially 20%. The maximum center thickness of the spectacle lens may be reduced preferably by at least 3%, especially 5%. The specified reduction relates to a spectacle lens without a carrier rim as the initial variable.

Furthermore, the invention provides a method for producing a spectacle lens with an object-sided front face and an eye-sided rear face, wherein at least the rear face comprises
  a viewing region, which contributes to the optical effect of the spectacle lens, and
  a carrier rim region, which surrounds at least partially the viewing region and which does not significantly contribute to the optical effect of the spectacle lens.

A calculation and/or optimization step of the rear face of the spectacle lens in the carrier rim region is/are carried out essentially from cosmetic viewpoints without considering the optical image-forming properties of the carrier rim region.

Preferably the calculation and/or optimization step comprise or comprises the calculation of a dividing curve on the rear face of the spectacle lens between the viewing region and the carrier rim region in the shape of a curve that connects the penetrating points of the outermost peripheral rays to the rear face. The outermost peripheral rays just barely pass, under direct vision, through the point of rotation Z' of the eye when the spectacle lens is in use position in front of an eye of a spectacle wearer; or in an especially preferred case, the outermost peripheral rays just barely pass, under indirect vision, through the center of the entrance pupil of the eye.

Furthermore, the calculation and/or optimization step preferably take or takes place in so that the shape and/or the design of the frame is/are taken into consideration. Then in particular, an optimal contour of the edge thickness of the spectacle lens or rather its variation in the encased state may be guaranteed.

The calculation and/or optimization step take(s) place in particular preferably in such a manner that the individual parameters of the spectacle wearer are considered. As a result, the outermost peripheral rays in use position can be calculated with high precision and, thus, the carrier rim region can be optimally designed.

The calculation and/or optimization step take or takes place most preferably so that the rear face in the carrier rim region is joined in a at least once, preferably in a twice continuously differentiable manner to the viewing region.

The calculation and/or optimization step may take place in such a manner that the parameters that are to be optimized according to cosmetic criteria are specified immediately during the optimization of the rear face. In this case, one assumes a surface extension for the rear face that must be flexible enough to enable the rear face in the carrier rim region to be suitably optimized in accordance with the predetermined parameters. Therefore, at least powers of the fourth order are needed especially in rotationally symmetrical aspheres. This procedure may be more advantageous especially with spectacle lenses with positive refractive power, because the optical effect of the spectacle lens changes as the critical parameters of the center thickness to be optimized according to cosmetic criteria changes.

The rear face in the carrier rim region can advantageously be optimized independently of the rear face in the viewing region. In other words, the calculation and/or optimization step of the rear face in the carrier rim region do or does not take place until after the calculation and/or the optimization of the rear face in the viewing region. Therefore, the carrier rim region, which is optimally shaped according to cosmetic criteria, can be adjoined to any specified rear face, and in particular independently of the shape of the rear face in the viewing region. The rear face in the viewing region may be, for example, a simple sphere or also a progressive face.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE DRAWINGS

All of the figures show the following choice of coordinate system. The optical axis of the system comprising spectacle lens and eye merges with the "z" axis.

The "x" and "y" axes, which are perpendicular to the optical axis, denote the horizontal (x) and the vertical (y) direction with the spectacle lens in use position.

Figure 1:
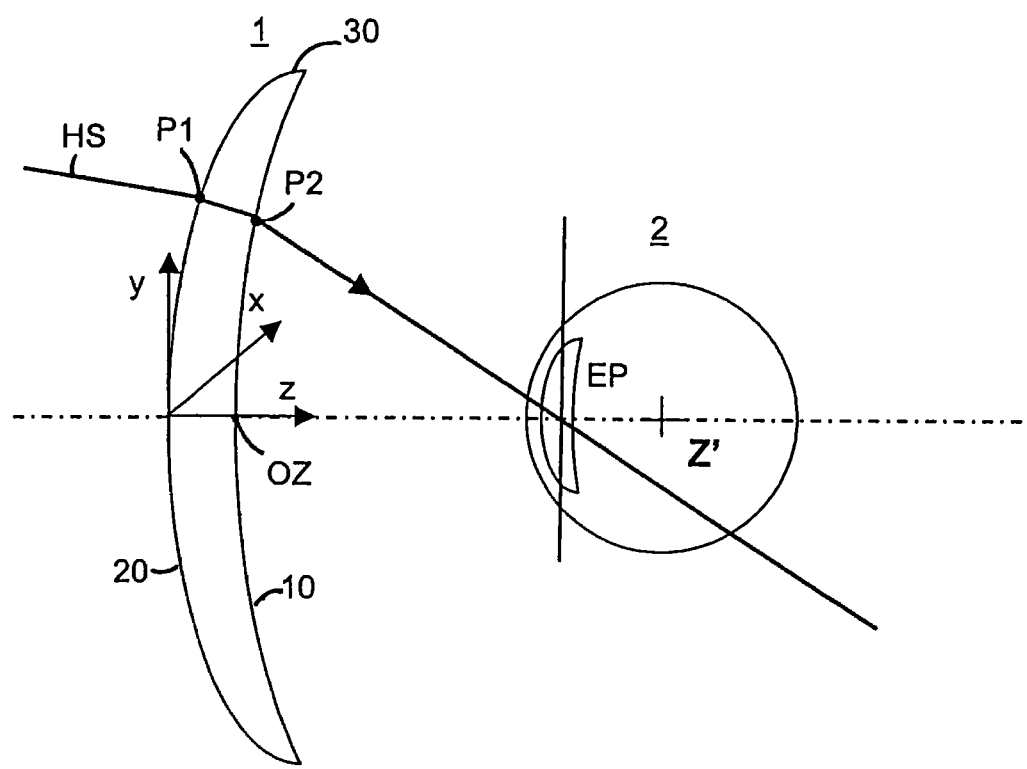
FIG. 1 is a schematic sectional view of the system comprising spectacle lens and eye under indirect vision.
Figure 2:
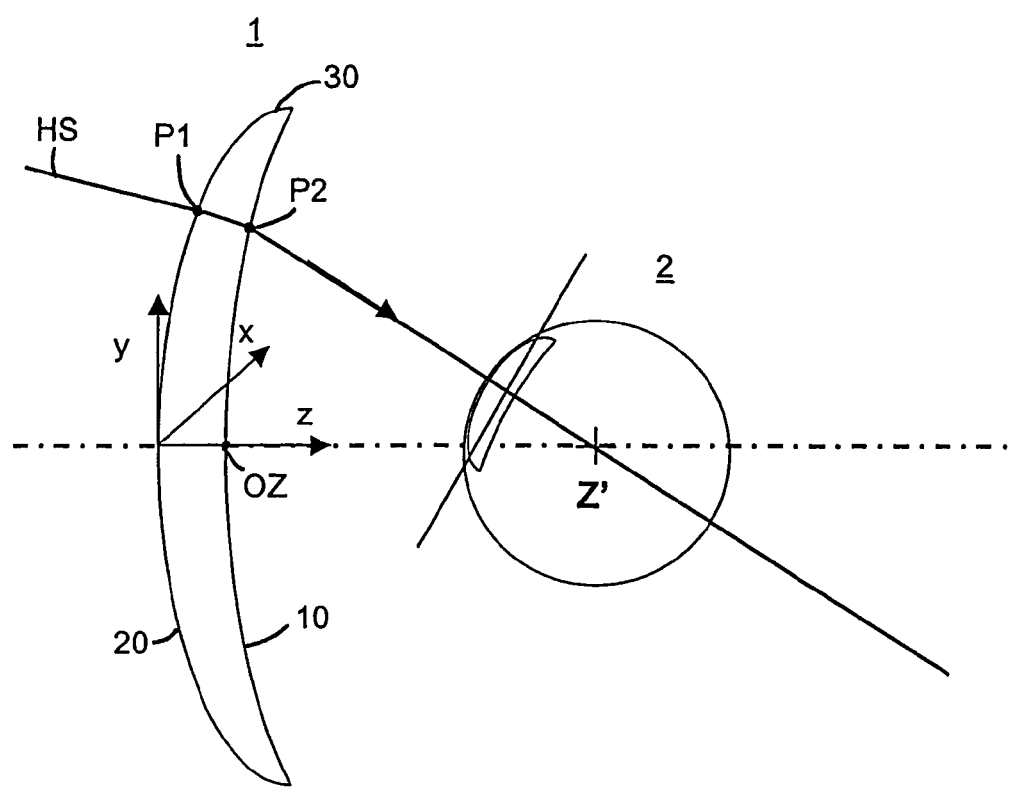
FIG. 2 is a schematic sectional view of the system comprising spectacle lens and eye under direct vision.

FIGS. 1 and 2 illustrate, as stated above, the calculation of the main rays passing, under direct and indirect vision, through the spectacle lens in use position.

FIG. 1 shows the system comprising spectacle lens and eye under indirect vision with the spectacle lens 1 in use position. The spectacle lens 1 (positive lens) exhibits a convex, object-sided front face 20 and a concave, eye-sided rear face 10. The eye 2 gazes through the accommodating point of the spectacle lens 1. The point O denotes the accommodating point on the rear face 10 of the spectacle lens 1; and the point Z' denotes the optical point of rotation of the eyeball. The rim of the spectacle lens 1 is labeled 30. P1 and P2 denote the penetrating points of the main ray HS through the front face 20 and/or the rear face 10 of the spectacle lens 1. The entrance pupil EP of the eye 2, which constitutes at the same time the aperture stop of the system, comprising spectacle lens and eye, determines the course of the main rays HS.

FIG. 2 shows the system comprising spectacle lens and eye under direct vision with the spectacle lens in the use position. The eye 2 is rotated about the optical point of rotation Z' of the eye. The penetrating points of the main ray HS through the front face 20 and/or the rear face 10 of the spectacle lens 1 are marked P1 and P2.

Figure 3A:
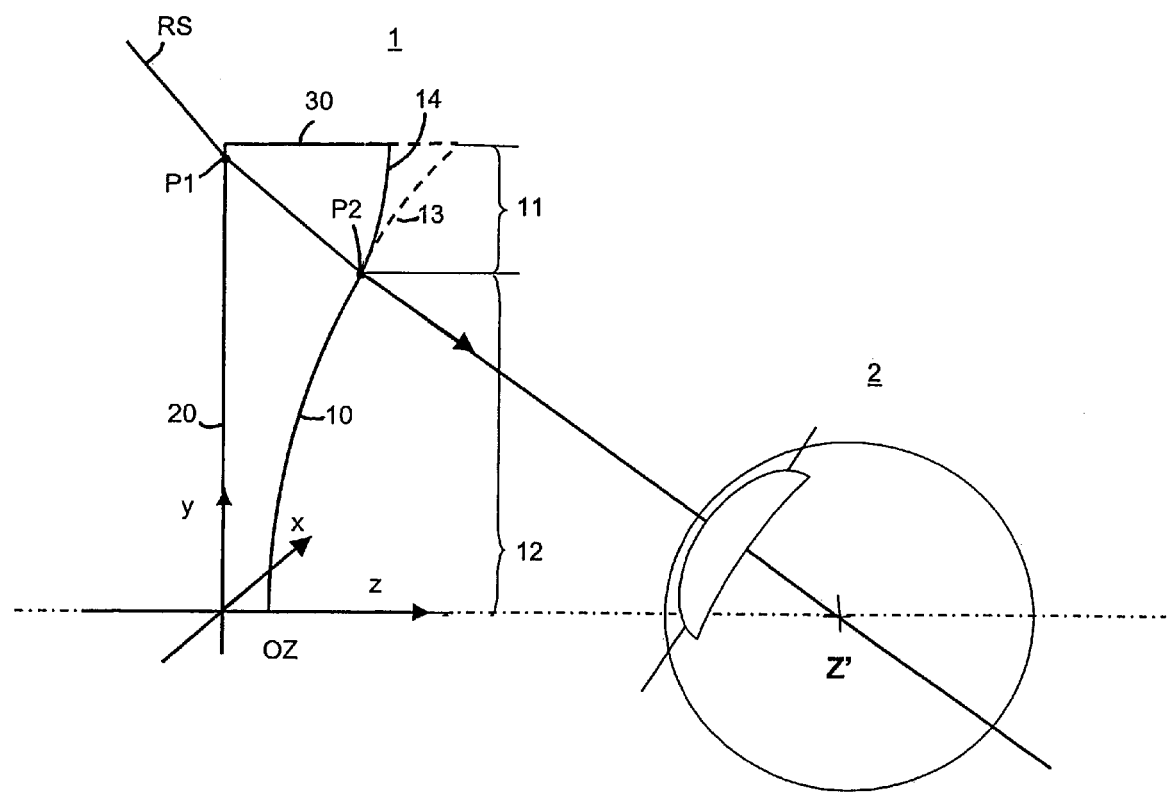
FIG. 3A is a schematic sectional view of a currently preferred spectacle lens of the present invention and the course of the peripheral ray in the system comprising spectacle lens and eye.

FIG. 3A schematically depicts an embodiment of a preferred negative spectacle lens 1 of the present invention. FIG. 3A shows in particular the course of an outermost peripheral ray RS in the spectacle lens-eye system under direct vision. Therefore, the eye 2 is rotated (direct vision) about the point of rotation Z' of the eye. The spectacle lens 1 exhibits a convex object-sided front face 20 and a concave eye-sided rear face 10. The outermost peripheral ray RS denotes that main ray that passes through the spectacle lens 1 to the eye 2 and just barely passes through the point of rotation Z' of the eye 2. This peripheral ray RS penetrates the front face 20 at point P1 and penetrates the rear face 10 of the spectacle lens at point P2. The penetrating point P2 of the peripheral ray RS through the rear face 10 of the spectacle lens 1 is shifted inwardly in the direction of the rim 30 of the spectacle lens 1 (in the direction of the optical center point of the spectacle lens) so that the result is that between the penetrating point P2 and the rim 30 of the spectacle lens 1 there is an area that does not contribute to the optical effect and represents the carrier rim region 11.

The imaginary curve, which connects the penetrating points P2 of all of the outermost peripheral rays RS through the rear face 10, is the dividing curve 15 between a viewing region 12 and a carrier rim region 11. As evident from FIG. 3A, the penetrating points P2 of the outermost peripheral rays RS through the rear face 10 are spaced apart from the rim 30 of the spectacle lens 1. The result is that between the spectacle rim 30 and the dividing curve there is the carrier rim region 11, which may be used for improving the cosmetic properties of the spectacle lens without significantly influencing the optical properties of the spectacle lens.

The rear face 10 in the carrier rim region 11 may be shaped especially with respect to reducing the edge thickness without thereby significantly influencing the optical properties of the spectacle lens 1. The line 14 shows an exemplary profile of the rear face 10 in the carrier rim region 11 of the preferred spectacle lens 1 of the invention. The dashed line 13, which is moved with respect to line 14 in the direction of the eye side, shows the profile of the rear face 10 in the carrier rim region 11 of the standard negative spectacle lens 1 without any reduction in the edge thickness. As evident from FIG. 3A, a significant reduction in the thickness of the edge may be achieved with the spectacle lens 1 of the invention without influencing the optical image-forming quality of the spectacle lens 1.

Furthermore, the profile 14 of the rear face 10 in the carrier rim region 11 may be designed to achieve a reduction in the variation of the edge thickness of the spectacle lens 1.

The viewing region 12 of the spectacle lens 1 is calculated and made according to the necessary purchase order values and/or the prescription values of the spectacle wearer. The rear face 10 in the viewing region 12 may be designed to guarantee optimal image-forming qualities of the spectacle lens. The rear face 10 in the viewing region 12 may be, for example, a spheric, aspheric, toric, atoric and/or a progressive face.

Figure 3B:
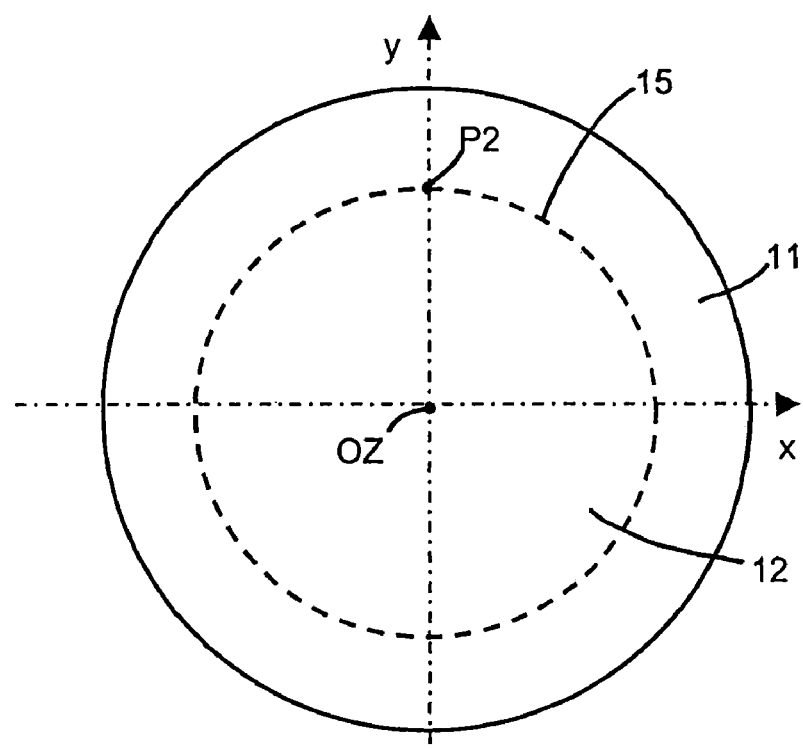
FIG. 3B is a schematic frontal view of the rear face of the inventive spectacle lens shown in FIG. 3A.

FIG. 3B is a top view of the rear face 10 of the spectacle lens 1. The dividing curve 15 between the viewing region 12 and the carrier rim region 11 is shown as a dashed line. The dividing curve 15 connects the penetrating points P2 of the outermost peripheral ray through the rear face 10.

FIGS. 3A and 3B show a negative spectacle lens. Therefore, the rear face 10 in the carrier rim region 11 is designed to minimize the edge thickness of a negative spectacle lens 1 and/or its variation. As stated above, instead of negative spectacle lenses, positive, astigmatic, prismatic and/or progressive spectacle lenses may also be considered. The results of the present invention's design of the rear face 10 are significant cosmetic advantages without significantly influencing or even having a negative impact on the optical properties. Furthermore, the rear face 10 in the carrier rim region 11 may be designed to minimize, instead of the edge thickness of the round-shaped spectacle lens, the edge thickness of the spectacle lens, encased in a frame, and/or its variation.

In the especially preferred spectacle lens, which is described as an example with reference to FIGS. 3A and 3B, the dividing curve between the carrier rim region 11 and the viewing region 12 is calculated for the case of direct vision. However, the dividing curve for the case of indirect vision can be calculated.

In this case the outermost peripheral ray is that main ray that penetrates the front and rear face and which just barely passes through the center of the entrance pupil of the eye with the spectacle lens in use position. Therefore, the eye looks through the accommodating point of the spectacle lens. The dividing curve may be calculated either for the case of direct vision or preferably for the case of indirect vision.

Furthermore, the steps of an exemplary method for calculating a spectacle lens of the invention are now described.

Acquisition of the Purchase Order Data.

The purchase order data are usually the dioptric effect with sphere, cylinder, axis, prism and base position and eventually the addition for additional strength or progressive spectacle lenses. The purchase order data determine the desired optical effect and, thus, the profile and/or the shape of the rear face in the viewing region.

Acquisition of the Spectacle Wearer's Individual Parameters.

The individual parameters of the spectacle wearer are, for example, the cornea-vertex-distance, the overall length of the eye, the distance of the point of rotation of the eye, the pupil distance, the front inclination, the lateral inclination, the angle of the frame disc, the object distance, etc. Such a consideration of the individual parameters of the spectacle wearer makes it possible to determine with precision the penetrating points of the outermost peripheral rays with the rear face of the spectacle lens in use position. Hence, the carrier rim region may be optimally configured and designed.

Acquisition of the Frame Shape.

In particular, the rear face of the carrier rim region may be designed to optimize the variation, for example, in the edge thickness in the encased state (i.e., when the spectacle lens is adjusted for a spectacle frame). However, the method is also applicable to round-shaped spectacle lenses.

Acquisition of the Frame Design.

Calculation of the contour of the frame shape on the spectacle lens.

The resulting calculated contour of the shape of the frame on the spectacle lens and especially on the rear side of the spectacle lens forms the peripheral curve. However, as an alternative, the rim of the round-shaped spectacle lens may form the peripheral curve.

Calculation of the Penetrating Points of the Outermost Peripheral Rays through the Rear Face.

Preferably—as stated above—the penetrating points of the outermost peripheral rays with the rear face of the spectacle lens are calculated under indirect vision, because it is more likely that indirect vision will be required on the periphery. Of course, the penetrating points of the outermost peripheral rays under direct vision can be calculated instead.

Calculation of the Dividing Curve.

This step includes a calculation of an (imaginary) curve that connects the penetrating points determined in step 6 for the peripheral rays through the rear face and that represents the dividing curve between the viewing region and the carrier rim region. This curve may be, e.g., a spline curve.

Calculation of the height of the crown of the rear face and the necessary radial diversions of the height of the crown along the dividing curve. The height of the crown is defined as the distance of a point on the rear face with the coordinates (x, y) from the tangential plane of the surface vertex.

Specification of the variation in the edge thickness along the curve of the rim and the resulting height of the crown of the rear face along the curve of the rim. Preferably the variation in the edge thickness along the curve of the rim is constant.

Calculation of the profile of the rear face in the carrier rim region, which radially connects the height of the crown along the dividing curve at least once continuously to the specified height of the crown along the curve of the rim.

Therefore, the edge thickness and/or the height of the crown along the curve of the rim immediately on optimizing the output rear face can be specified. To enable this, the surface extension, chosen for the output rear face, must be flexible enough. For example, in the case of a rotationally symmetrical asphere at minimum powers of the fourth order are necessary. This method may be more advantageous especially with spectacle lenses with a positive refractive power, because then as the center thickness varies the optical effect in the viewing region also changes.

It may also be advantageous, however, if the profile of the rear face in the carrier rim region is not calculated until after the surface calculation and/or optimization of the rear face in the viewing region. The result is that the output rear face may be any arbitrary surface, such as a simple sphere or a progressive surface, independently of the shape of the rear face in the carrier rim region.

Preferably the rear face of the spectacle lens is designed so that the rear face in the carrier rim region is joined in a at least once, preferably in a twice continuously a differentiable manner to the rear face in the viewing region.

The method, according to this invention, makes it possible, depending on the dioptric effect, to decrease the maximum edge thickness by about 25%, the variation in the edge thickness by about 50%, and the maximum center thickness of a spectacle lens by about 10%.

The invention claimed is:

1. Spectacle lens having object-sided front face and an eye-sided rear face, wherein the rear face is a smooth and continuous surface which comprises a viewing region disposed thereon which contributes to the optical effect of the spectacle lens, and wherein the rear face further comprises a carrier rim region also disposed thereon which surrounds at least partially the viewing region and which does not significantly contribute to the optical effect of the spectacle lens, wherein the rear face in the carrier rim region is constructed substantially based on desired cosmetic properties, without consideration of optical image-forming properties, wherein the viewing region is separated from the carrier rim region on the rear face of the spectacle lens by a dividing curve that connects penetrating points of outermost peripheral rays to the rear face, said outermost peripheral rays just barely passing, under direct vision, through a point of rotation of the eye when the spectacle lens is in a use position in front of an eye, wherein the carrier rim region extends from the dividing curve radially as far a peripheral curve matching a rim of the spectacle lens in an encased state, and wherein further the rear face in the carrier rim region is constructed to consider:
   at least one of a frame shape and a frame design; and
   individual parameters of the spectacle wearer.

2. Spectacle lens as claimed in claim 1, wherein the spectacle lens exhibits at least one of a positive, negative, progressive, astigmatic and prismatic optical power.

3. Spectacle lens as claimed in claim 1, wherein the rear face is designed so that the rear face of the carrier rim region is joined in a at least once, preferably in a twice continuously, differentiable manner to the rear face in the viewing region.

4. Spectacle lens as claimed in claim 1, wherein the rear face in the carrier rim region is constructed to reduce at least one of an edge thickness, edge thickness variation and center thickness of the spectacle lens.

5. Spectacle lens as claimed in claim 1, wherein the rear face in the carrier rim region is configured to reduce volume and mass of the entire spectacle lens.

6. Spectacle lens having object-sided front face and an eye-sided rear face, wherein the rear face is a smooth and continuous surface which comprises a viewing region disposed thereon which contributes to the optical effect of the spectacle lens, and wherein the rear face further comprises a carrier rim region also disposed thereon which surrounds at least partially the viewing region and which does not significantly contribute to the optical effect of the spectacle lens, wherein the rear face in the carrier rim region is constructed substantially based on desired cosmetic properties, without consideration of optical image-forming properties, wherein the viewing region is separated from the carrier rim region on the rear face of the spectacle lens by a dividing curve that connects the penetrating points of outermost peripheral rays to the rear face, and said outermost peripheral rays just barely pass, under indirect vision, through the center of the entrance pupil of the eye, wherein the carrier rim region extends from the dividing curve radially as far a peripheral curve matching a rim of the spectacle lens in an encased state, and wherein further the rear face in the carrier rim region is constructed to consider:
   at least one of a frame shape and a frame design; and
   individual parameters of the spectacle wearer.

7. Method for producing a spectacle lens with an object-sided front face and an eye-sided rear face, wherein the rear face is a smooth and continuous surface, and wherein the spectacle lens comprises a viewing region on the rear face that contributes to the optical effect of the spectacle lens, and wherein the spectacle lens further comprises a carrier rim region that is also on the rear face and that at least partially surrounds the viewing region and does not significantly contribute to the optical effect of the spectacle lens, comprising carrying out at least one of a calculation and optimization of the rear face in the carrier rim region carried out essentially based on desired cosmetic properties, without considering the optical image-forming properties of the carrier rim region, wherein the at least one of calculation and optimization comprises calculation of a dividing curve on the rear face between the viewing region and the carrier rim region in a curve shape that connects penetrating points of outermost peripheral rays to the rear face, said outermost peripheral rays just barely passing, under direct vision, through a point of rotation of the eye when the spectacle lens is in a use position in front of the eye of a spectacle wearer, wherein the carrier rim region extends from the dividing curve radially as far a peripheral curve matching a rim of the spectacle lens in an encased state, and wherein further the rear face in the carrier rim region is constructed to consider:
   at least one of a frame shape and a frame design; and
   individual parameters of the spectacle wearer.

8. Method as claimed in claim 7, wherein the at least one calculation and optimization takes place so that the rear face in the carrier rim region is joined in a at least once, preferably in a twice, continuously, differentiable manner to the rear face in the viewing segment.

9. Method for producing a spectacle lens with an object-sided front face and an eye-sided rear face, wherein the rear face is a smooth and continuous surface, and wherein the spectacle lens comprises a viewing region on the rear face that contributes to the optical effect of the spectacle lens, and wherein the spectacle lens further comprises a carrier rim region that is also on the rear face and that at least partially surrounds the viewing region and does not significantly contribute to the optical effect of the spectacle lens, comprising carrying out at least one of a calculation and optimization of the rear face in the carrier rim region carried out essentially based on desired cosmetic properties, without considering the optical image-forming properties of the carrier rim region, wherein the at least one of calculation and optimization comprises calculation of a dividing curve on the rear face between the viewing region and the carrier rim region in a curve shape that connects penetrating points of outermost peripheral rays to the rear face, wherein the viewing region is separated from the carrier rim region on the rear face of the spectacle lens by a dividing curve that connects the penetrating points of outermost peripheral rays to the rear face, and said outermost peripheral rays just barely pass, under indirect vision, through the center of the entrance pupil of the eye, wherein the carrier rim region extends from the dividing curve radially as far a peripheral curve matching a rim of the spectacle lens in an encased state, and wherein further the rear face in the carrier rim region is constructed to consider:
   at least one of a frame shape and a frame design; and
   individual parameters of the spectacle wearer.

* * * * *